United States Patent
Gregorio

(10) Patent No.: US 7,946,271 B2
(45) Date of Patent: *May 24, 2011

(54) HAPTIC DEVICE IN A VEHICLE AND METHOD THEREOF

(75) Inventor: Pedro Gregorio, Verdun (CA)

(73) Assignee: Immersion Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/182,960

(22) Filed: Jul. 30, 2008

(65) Prior Publication Data
US 2008/0283024 A1 Nov. 20, 2008

Related U.S. Application Data

(63) Continuation of application No. 11/493,858, filed on Jul. 25, 2006, now Pat. No. 7,406,943, which is a continuation of application No. 10/975,051, filed on Oct. 28, 2004, now Pat. No. 7,096,852.

(60) Provisional application No. 60/516,187, filed on Oct. 30, 2003.

(51) Int. Cl.
*F02D 11/10* (2006.01)
*G06F 19/00* (2006.01)

(52) U.S. Cl. ........... 123/396; 123/399; 701/70; 701/96; 701/110; 701/117

(58) Field of Classification Search .............. 123/361, 123/396, 399; 701/110, 111, 115, 117, 1, 701/48, 60, 65, 70, 96, 301
See application file for complete search history.

(56) References Cited

U.S. PATENT DOCUMENTS

| 4,380,799 A | 4/1983 | Allard et al. |
| 4,574,757 A | 3/1986 | Schulman et al. |
| 5,044,956 A | 9/1991 | Behensky et al. |
| 5,113,721 A | 5/1992 | Polly |
| 5,116,051 A | 5/1992 | Moncrief et al. |
| 5,197,003 A | 3/1993 | Moncrief et al. |
| 5,368,484 A | 11/1994 | Copperman et al. |
| 5,547,383 A | 8/1996 | Yamaguchi |

(Continued)

FOREIGN PATENT DOCUMENTS

JP 4-8381 1/1992

(Continued)

OTHER PUBLICATIONS

Buchholz, Kami, "Enhanced Lighting One of BMW Research Focuses", Focus on Electronics, AEI Automotive Engineering International, pp. 97-103, Feb. 2003.

(Continued)

*Primary Examiner* — Thomas N Moulis
(74) *Attorney, Agent, or Firm* — Nixon Peabody LLP

(57) ABSTRACT

A system and method for providing a haptic device in a vehicle. The system comprises a foot operated pedal of a vehicle. A sensor is coupled to the pedal and is configured to sense a position of the pedal during use. The sensor is configured to output a sensor signal associated with the position of the pedal. A processor is coupled to the sensor and is configured to receive the sensor signal. The processor outputs a control signal upon the pedal moving past a threshold position. An actuator is coupled to the processor, wherein the actuator is configured to output a haptic feedback force to the pedal upon receiving the control signal from the processor.

16 Claims, 5 Drawing Sheets

U.S. PATENT DOCUMENTS

| | | | |
|---|---|---|---|
| 5,583,407 A | 12/1996 | Yamaguchi | |
| 5,691,898 A | 11/1997 | Rosenberg et al. | |
| 5,701,140 A | 12/1997 | Rosenberg et al. | |
| 5,742,278 A | 4/1998 | Chen et al. | |
| 5,868,573 A | 2/1999 | Kerby et al. | |
| 6,020,875 A | 2/2000 | Moore et al. | |
| 6,067,871 A | 5/2000 | Markyvech et al. | |
| 6,219,604 B1 * | 4/2001 | Dilger et al. | 701/41 |
| 6,283,859 B1 | 9/2001 | Carlson et al. | |
| 6,324,928 B1 | 12/2001 | Hughes | |
| 6,362,729 B1 | 3/2002 | Hellmann et al. | |
| 6,389,332 B1 * | 5/2002 | Hess et al. | 701/1 |
| 6,414,607 B1 | 7/2002 | Gonring et al. | |
| 6,437,771 B1 | 8/2002 | Rosenberg et al. | |
| 6,485,113 B2 | 11/2002 | Riley et al. | |
| 6,525,711 B1 | 2/2003 | Shaw et al. | |
| 6,636,197 B1 | 10/2003 | Goldenberg et al. | |
| 6,724,321 B2 * | 4/2004 | Kuragaki et al. | 340/928 |
| 6,772,062 B2 | 8/2004 | Lasky et al. | |
| 6,791,471 B2 | 9/2004 | Wehner et al. | |
| 6,904,823 B2 | 6/2005 | Levin et al. | |
| 6,961,644 B2 | 11/2005 | Mercier et al. | |
| 6,965,370 B2 | 11/2005 | Gregorio et al. | |
| 7,072,764 B2 | 7/2006 | Donath et al. | |
| 7,096,852 B2 | 8/2006 | Gregorio | |
| 7,400,963 B2 * | 7/2008 | Lee et al. | 701/93 |
| 7,520,358 B2 * | 4/2009 | Ehmanns et al. | 180/178 |
| 7,570,156 B2 * | 8/2009 | Cicilloni et al. | 340/435 |
| 7,579,942 B2 * | 8/2009 | Kalik | 340/435 |
| 7,603,228 B2 * | 10/2009 | Coughlin | 701/123 |
| 2002/0142701 A1 | 10/2002 | Rosenberg | |
| 2003/0130091 A1 * | 7/2003 | Wafzig | 477/120 |
| 2005/0149251 A1 | 7/2005 | Donath et al. | |
| 2006/0155454 A1 * | 7/2006 | Herrmann et al. | 701/70 |
| 2006/0195231 A1 * | 8/2006 | Diebold et al. | 701/1 |
| 2006/0284481 A1 * | 12/2006 | Yone | 303/155 |
| 2007/0213915 A1 * | 9/2007 | Tange et al. | 701/96 |
| 2007/0213916 A1 * | 9/2007 | Sugano et al. | 701/96 |
| 2007/0255481 A1 * | 11/2007 | Egawa et al. | 701/96 |
| 2009/0051516 A1 * | 2/2009 | Abel et al. | 340/436 |
| 2009/0112439 A1 * | 4/2009 | Kuang et al. | 701/99 |
| 2009/0177360 A1 * | 7/2009 | Kustosch | 701/45 |

FOREIGN PATENT DOCUMENTS

| | | |
|---|---|---|
| JP | 4-92691 | 3/1992 |
| JP | 4-232829 | 8/1992 |

OTHER PUBLICATIONS

Varhelyi, Andras et al., "The Effects of Large Scale Use of Active Accelerator Pedal In Urban Areas", 15th ICTCT Workshop, Brno, Czech Republic, pp. 1-7, Oct. 24-25, 2002.

"Electronic Throttle Control—(Drive By Wire or Fly By Wire)", Auto-Solve, Miscellaneous Topics, date unknown.

* cited by examiner

HAPTIC DEVICE IN A VEHICLE AND METHOD THEREOF

CROSS-REFERENCE TO RELATED APPLICATIONS

The present application is a continuation of U.S. patent application Ser. No. 11/493,858, filed Jul. 25, 2006 which is a continuation of U.S. patent application Ser. No. 10/975,051, filed Oct. 28, 2004, now U.S. Pat. No. 7,096,852 which claims the benefit of U.S. Provisional Patent Application Ser. No. 60/516,187, filed on Oct. 30, 2003, entitled "Self-Regulating Resistive Actuator For Automotive Throttle Pedal Force Feedback," commonly owned herewith.

BACKGROUND

The present relates generally to haptic feedback systems, and more particularly, to a haptic feedback system associated with an automotive throttle actuator.

Control of a vehicle through the use of electronically-controlled mechanisms rather than mechanically-controlled mechanisms has been implemented in different forms. Typically called "steer-by-wire," "drive-by-wire," or "control-by-wire," electronically-controlled mechanisms direct electric motors and/or hydraulic or pneumatic control systems, to perform mechanical operations rather than a user directly performing the mechanical operations using a mechanical interface. For example, in a standard mechanical steering system in an automobile, the user moves a steering wheel, which mechanically rotates rods, gears, and other mechanical elements to turn the front wheels based on the motion of the steering wheel. In a drive-by-wire system, the user rotates the steering wheel (or moves some other type of manipulandum) to generate control signals to control one or more electric motors, hydraulic actuators, etc., which turn the front wheels. No mechanical linkage between steering wheel motion and wheel motion exists (unlike power assisted steering). A processor (microprocessor, etc.) can be used to sense motion of the steering wheel and correlate it with motor control to achieve the corresponding steering of the wheels.

Another vehicle control system that is typically now electronically-controlled rather than mechanically-controlled is the vehicle throttle control. Automotive throttle pedals historically provided a characteristic force against a driver's foot as a function of pedal displacement. In the past, this force was associated with mechanical linkages and a cable connecting the throttle pedal to the throttle valve in the engine. Rather than direct pedal control of throttle position, newer Electronic Throttle Control (ETC) systems use servo-valves.

In ETC systems, the throttle pedal provides only a sensor input to the ETC and, in the absence of the inherent friction associated with traditional mechanical throttle valve linkages, the characteristic force feedback to the driver must be recreated by other means. The force profile associated with known throttle control generally includes an increasing reaction force against the driver's foot the farther the pedal is depressed. This increased physical effort applied by the driver is consistent with the increased effort associated with the vehicle to achieve the desired acceleration.

Known mechanical systems that reproduce and/or simulate the necessary friction, however, are not ideal due to variation in the friction output associated with various parameters including system component inconsistencies, mechanical wear of system components, and variation in operating environment (e.g., temperature, humidity, atmospheric pressure, etc.).

A need exists for improvements in feedback to throttle controls using throttle-by-wire systems to produce desired haptic effects.

OVERVIEW

A system and method for providing a haptic device in a vehicle. The system comprises a foot operated pedal of a vehicle. A sensor is coupled to the pedal and is configured to sense a position of the pedal during use. The sensor is configured to output a sensor signal associated with the position of the pedal. A processor is coupled to the sensor and is configured to receive the sensor signal. The processor outputs a control signal upon the pedal moving past a threshold position. An actuator is coupled to the processor, wherein the actuator is configured to output a haptic feedback force to the pedal upon receiving the control signal from the processor.

DETAILED DESCRIPTION

An apparatus is disclosed that includes a sensor configured to be coupled to a throttle interface. The sensor is configured to output a sensor signal associated with a condition of the throttle interface. A first brake element has a first friction surface, and a second brake element has a second friction surface. The second brake element is configured to be coupled to the throttle interface. The friction surface associated with the first brake element is positioned opposite the friction surface associated with the second brake element. The first brake element is configured to move relative to the second brake element. An actuator is coupled to the first brake element and is configured to output haptic feedback to the throttle interface via the first brake element based on the sensor signal.

In other embodiments, a method includes receiving a first input signal from a throttle interface and outputting a sensor signal associated with the input signal, the sensor signal being associated with the first input signal. Haptic feedback associated with the sensor signal is output via an actuator. A second input signal is received at a processor, the second input signal being associated with information independent of an operation of the throttle interface. Haptic feedback associated with the second input signal is output.

A related control-by-wire embodiment is "shift-by-wire," in which an automobile or other vehicle having a driving transmission is shifted through its transmission gears using electronic control rather than direct mechanical control. Thus, instead of the user moving a shift lever to predetermined mechanical positions to mechanically change gears, the user can manipulate an electronic control and the electronic system can change the actual transmission gears. A shift-by-wire system is disclosed in U.S. patent application Ser. No. 10/116,237 now U.S. Pat. No. 6,904,823.

Figure 1:
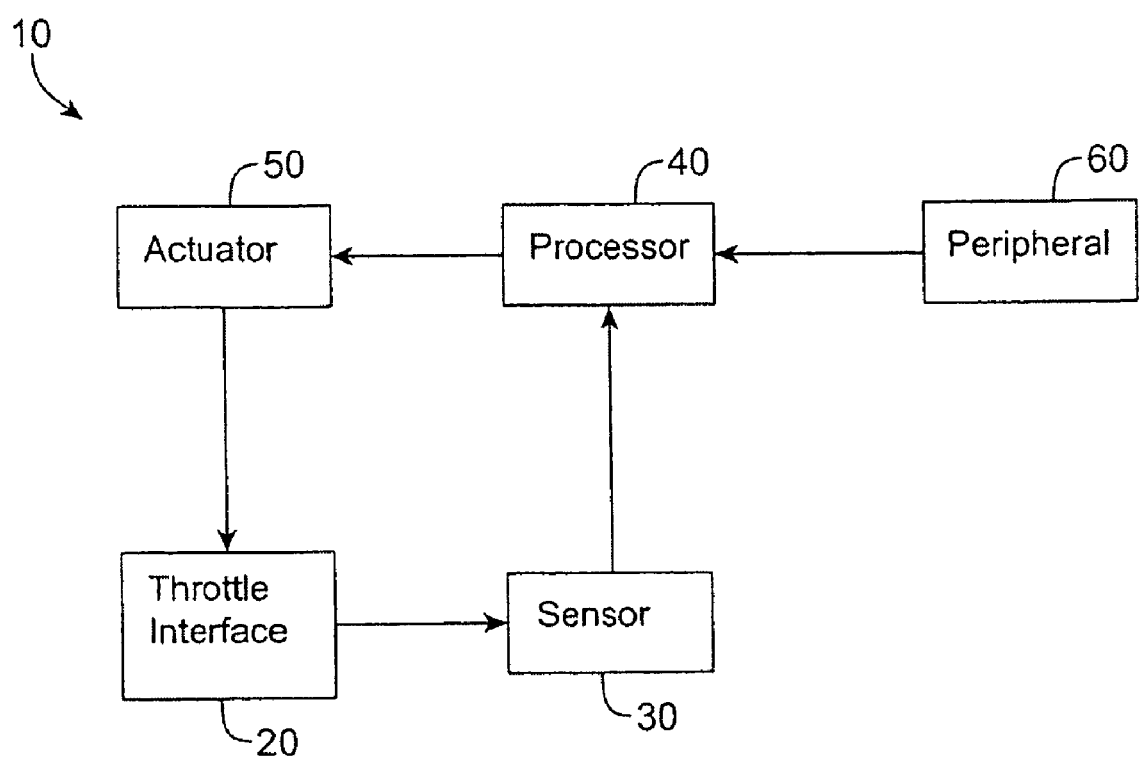
FIG. 1 is a schematic representation of a haptic throttle device according to an embodiment.

Referring to FIG. 1, a schematic illustration of a haptic throttle device is illustrated. The haptic throttle device 10 includes a throttle interface 20. A sensor 30 is configured to output a sensor signal associated with a condition of the throttle interface 20. For example, sensor 30 can be a position sensor configured to measure a relative or absolute position of the throttle interface, a strain gauge to measure a strain associated with input received from the throttle interface, and/or a force sensor configured to measure a magnitude of a force input from the throttle interface 20.

Sensor 30 can include, for example, optical encoders that provide signals to measure the movement of the throttle interface 20. Other types of sensors can also be used such as, for example, a potentiometer, a Hall effect sensor, a resolver, a load cell, a force sensitive resistor, a MEMS micro strain sensor, a resistive sensor, a piezoelectric sensor, a Linear Variable Displacement Transducer (LVDT), a Rotational Variable Displacement Transformer (RVDT), a capacitive sensor, or other analog or digital sensor. The sensor 30 can be an absolute or relative sensor.

The signal output from the sensor 30 is transmitted to a processor 40. In some embodiments, the processor includes a processor readable medium. The processor 40 is configured to receive signals from the sensor 30 and output signals to an actuator 50. In some embodiments, the processor 40 can receive and process signals associated with information independent of an operation of the throttle interface. For example, the processor 40 can receive signals from peripheral devices and/or systems 60 as will be discussed below.

The processor 40, according to some embodiments, can be a commercially available microprocessor or combination of microprocessors. Alternatively, the processor 40 can be an application-specific integrated circuit (ASIC) or a combination of ASICs, which are designed to achieve one or more specific functions, or enable one or more specific devices or applications. In yet another embodiment, the processor 40 can be an analog or digital circuit, or a combination of multiple circuits.

In some embodiments, the processor 40 includes or is coupled to the processor readable medium. The processor readable medium can include, for example, one or more types of memory. For example, the processor readable medium can include a read only memory (ROM) component and a random access memory (RAM) component. The processor readable medium can also include other types of memory that are suitable for storing data in a form retrievable by the processor 40. For example, electronically programmable read only memory (EPROM), erasable electronically programmable read only memory (EEPROM), flash memory, as well as other suitable forms of memory can be included within the processor readable medium. The processor 40 can also include a variety of other components, such as for example, co-processors, graphics processors, etc., depending upon the desired functionality of the interface device 10.

The processor 40 can store data in the processor readable medium or retrieve data previously stored in the processor readable medium. The components of the processor 40 can communicate with peripheral devices 60 external to the processor 40 by way of an input/output (I/O) component (not shown). According to some embodiments, the I/O component can include a variety of suitable communication interfaces. For example, the I/O component can include, for example, wired connections, such as standard serial ports, parallel ports, universal serial bus (USB) ports, S-video ports, local area network (LAN) ports, small computer system interface (SCSI) ports, and so forth. Additionally, the I/O component can include, for example, wireless connections, such as infrared ports, optical ports, Bluetooth® wireless ports, wireless LAN ports, or the like.

The actuator 50 is configured to output haptic feedback to the throttle interface 10 based on at least the sensor signal. The actuator 50 is configured to simulate friction that would be output by known gear and cable throttle systems. The actuator 50 can be for example, an electromagnetic actuator such as a solenoid, a voice coil, a DC motor, a linear actuator, a moving magnet actuator, a piezoelectric actuator, an electroactive polymer (EAP), a resistive actuator (e.g., a brake), a pneumatic actuator, etc. As will be discussed in greater detail, passive actuators, such as brakes, output a resistance to inhibit motion of the throttle interface, rather than outputting an active force on the throttle interface independently of the input as with active actuators. In some embodiments, the actuator 50 can include more than one actuator.

Figure 2:
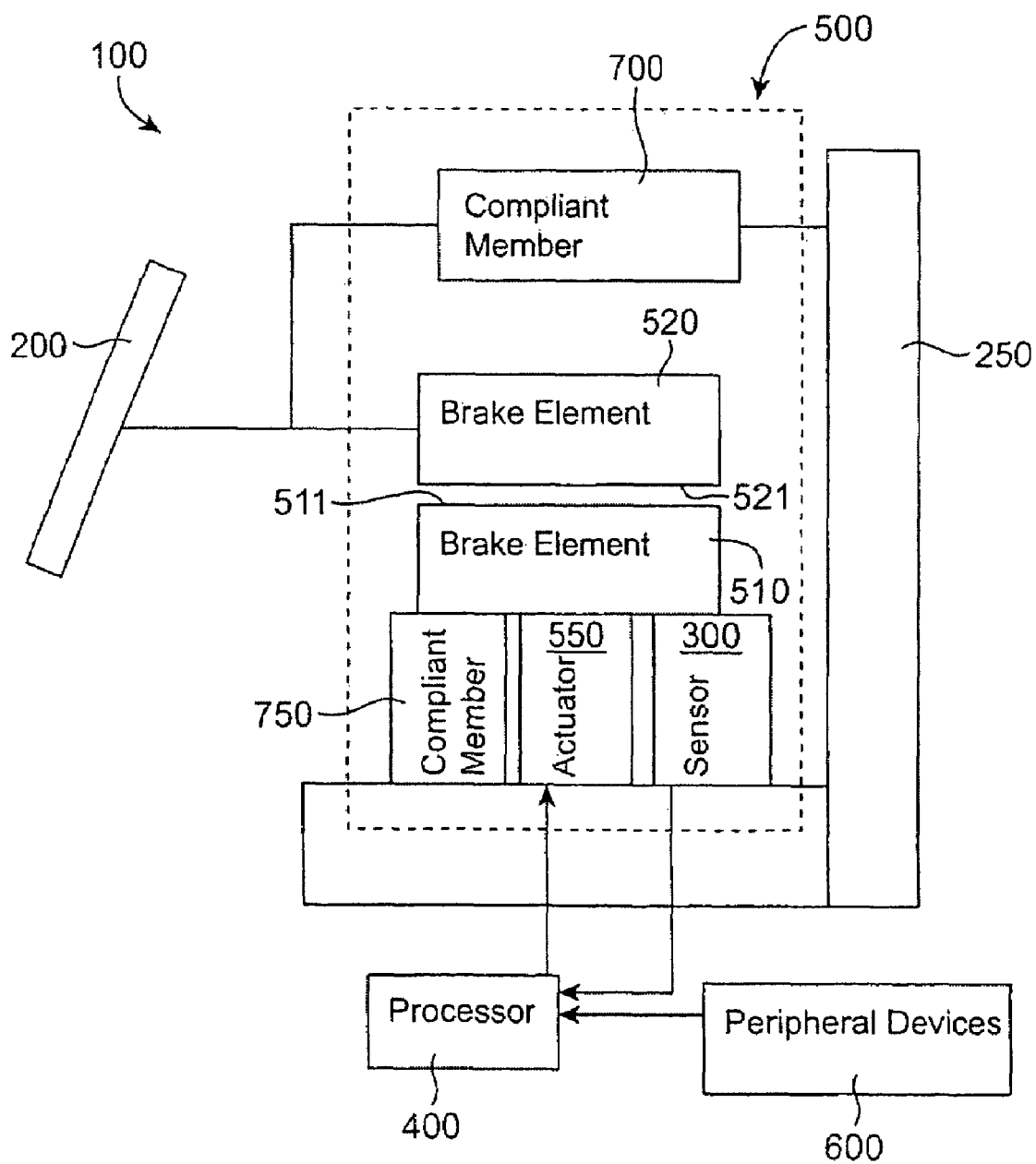
FIG. 2 is a schematic representation of a haptic throttle device according to another embodiment.

Referring to FIG. 2, in another embodiment, a device 100 includes a throttle interface 200, a sensor 300, an actuator assembly 500 and a processor or controller 400. The actuator assembly 500 includes a brake element 510 that has a friction surface 511, and a brake element 520 that has a friction surface 521. The friction surfaces 511, 521 can be, for example, metal (coated or uncoated), asbestos or other fibrous material, and/or a bushing material (e.g., sintered bronze and/or hard plastic). The friction surfaces 511, 521 need not include the same materials. A film or coating (not shown), a lubricant, or other fluid can be disposed between the friction surfaces 511, 521 (e.g., lubricating oil or grease, or dry film lubrication including mineral oil, natural or synthetic lubricants, molybdenum disulfide, PTFE, graphite, etc.) to enhance or control friction, mechanical wear or other desired properties.

The brake element 520 is coupled to the throttle interface 200. The friction surface 511 associated with the brake element 510 is positioned opposite the friction surface 521 associated with the brake element 520. The brake element 510 is configured to move relative to the brake element 520. For example, the brake element 510 and brake element 520 can be parallel plates that move with respect to each other in a linear or rotary direction. An actuator 550 is coupled to the brake element 510 and is configured to output haptic feedback to the throttle interface 200 via the brake elements 510, 520 based on a sensor signal received from the sensor 300. The components of actuator assembly 500 can be mounted to a housing 250 or some other mechanical ground (e.g., a vehicle body in which the device 100 is disposed). For example, brake elements 510, 520 can be coupled, either directly or indirectly, to the housing 250.

The actuator 550 is configured to output a force substantially normal to the brake element 510 and the brake element 520. The force output by the actuator 550 causes a friction force between the friction surface 511 and the friction surface 521. For example, the actuator 550 can be a voice coil-type actuator and can urge the brake element 510 towards the brake element 520 to cause the friction surfaces 511, 521 to move together, thereby resulting in a friction force as the brake element 520 moves with respect to brake element 510. Depending upon the magnitude of the force output by the actuator 550, the resulting friction force will be modified. As illustrated in FIG. 2, the brake element 520 is coupled to the throttle interface 200. When a force is input to the throttle interface 200 by a user, the brake element 520 moves with respect to the brake element 510. Depending upon the friction force that is applied, the haptic feedback felt by the user will vary. For example, as the throttle interface 200 is depressed by a user, the further the throttle interface 200 is depressed, the greater the magnitude of the haptic feedback output.

The processor 400 is configured to receive signals from the sensor 300 associated with inputs from the throttle interface 200. The processor 400 defines the control signal output to the actuator to modify the haptic feedback output to the throttle interface 200. In some embodiments, the processor 400 receives input signals from peripheral devices 600. For example, the peripheral devices 600 can include, for example, vehicle control systems such as the transmission, engine control systems, cruise control systems, driver preference systems such as climate control, weather sensing systems, vehicle fluid sensing systems, etc.

Figure 4:
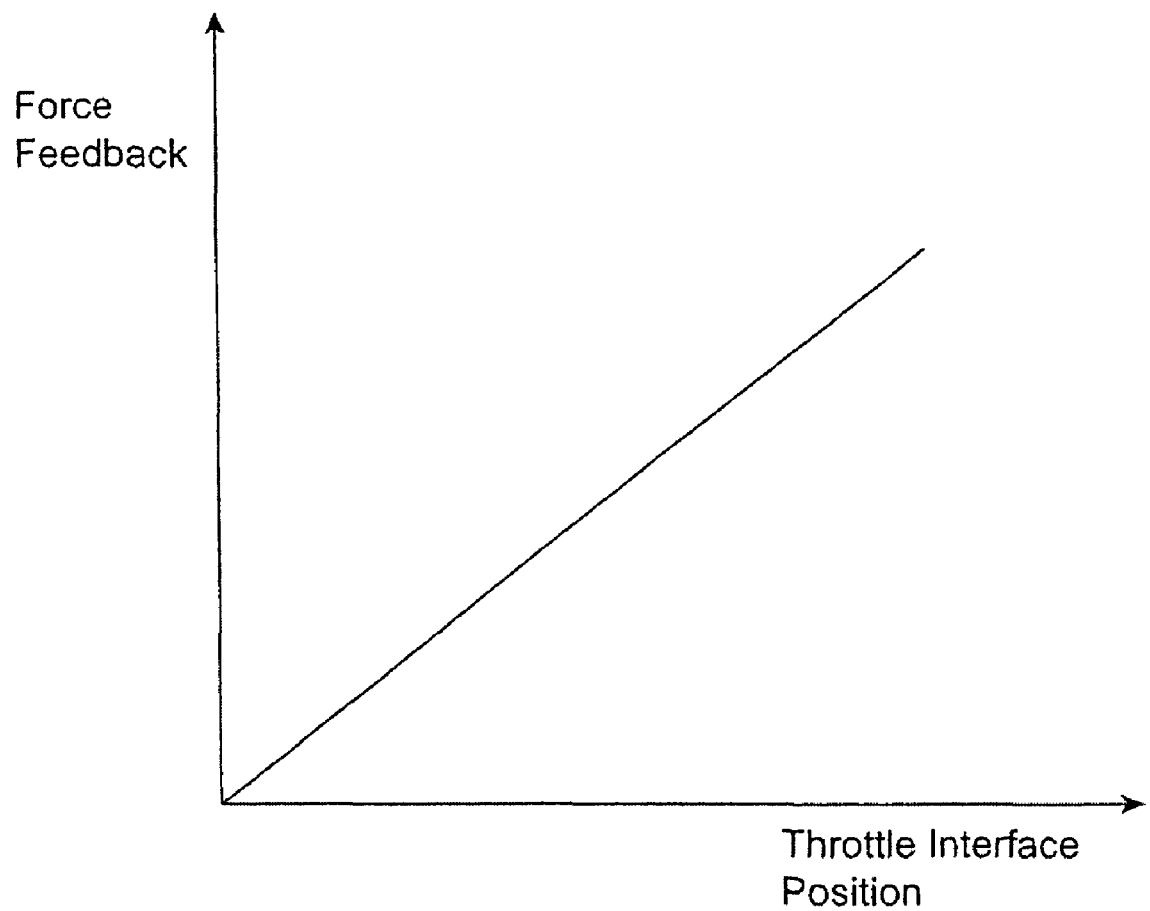
FIG. 4 is a graph illustrating an example of a relationship between force feedback provided to a throttle interface and the position of the throttle interface according to an embodiment.

A graph illustrating an example of a relationship between the magnitude of the force feedback provided to the throttle interface 200 and the position of the throttle interface is shown in FIG. 4. Although not illustrated in FIG. 4, it is understood that when the position of the throttle interface 200 is maintained constant over time, the magnitude of the force feedback provided to the throttle interface is substantially constant.

In some embodiments, the processor 400 can receive a signal associated with peripheral devices 600 and indicating, for example, that a predetermined threshold has been reached with respect to vehicle speed or engine RPM, or that the vehicle is approaching a barrier, etc. In such a situation, the actuator 550 can cause an increase in the friction force between the friction surfaces 511, 521 to prevent the throttle interface 200 from being pushed further.

Other peripheral devices 600 from which the processor 400 can receive signals include, for example, a wireless device such as a mobile phone, a Personal Digital Assistant (PDA), a radio, a CD player, and MP3 player, etc. In some embodiments, the processor 400 can receive signals from external sensors that detect allowable speed limits, global position, etc.

Figure 5:
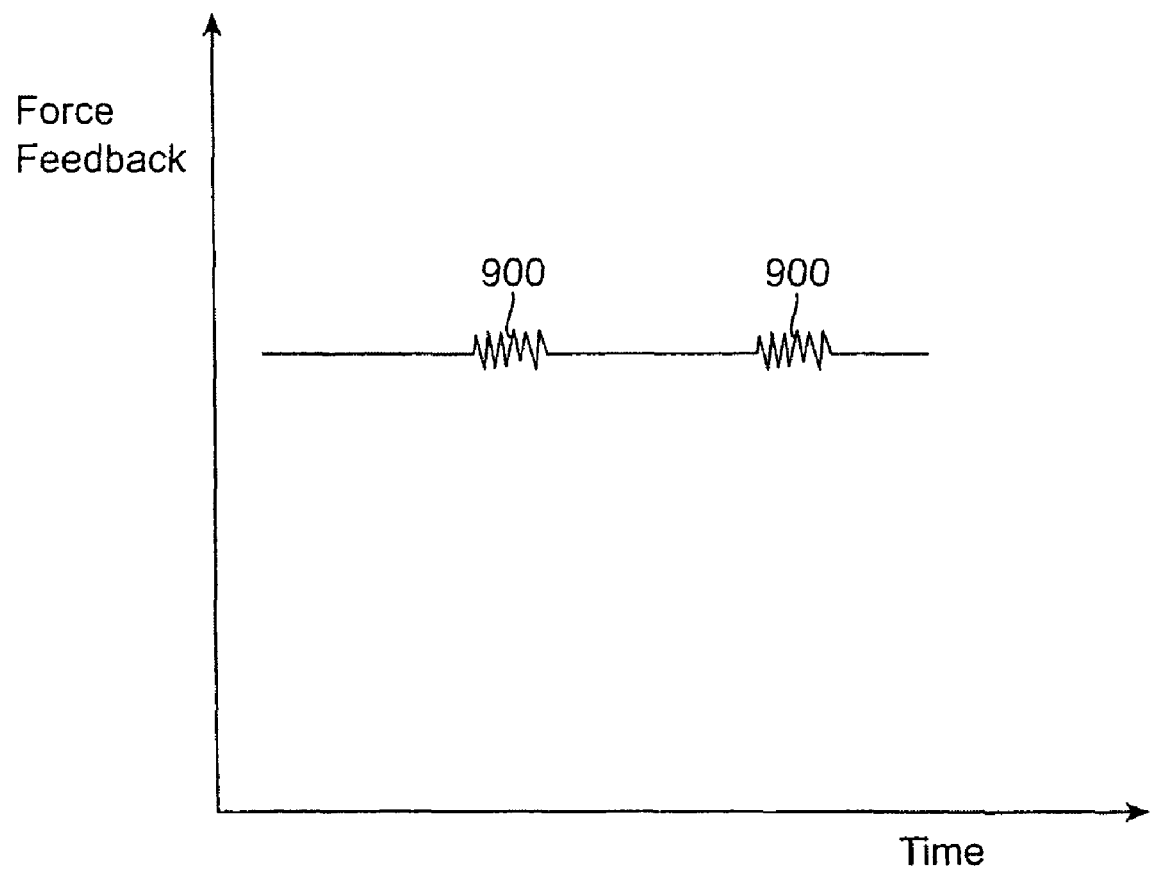
FIG. 5 is a graph illustrating an example of force feedback provided to the interface device of FIG. 2 over a period of time according to an embodiment.

FIG. 5 is a graph illustrating an example of the magnitude of the force feedback provided to the interface device 200 over a period of time. Haptic effects 900 are output at certain times based on sensor signals received from peripheral devices 600. The illustrated haptic effects 900 are provided by way of example only. As discussed below, any haptic effect can be output based on the sensor signal. As a result of the output of haptic effects 900, the user engaging the throttle will receive a particular feedback depending upon the peripheral device 600 with which the particular signal is associated.

In some embodiments, compliant element 700, such as a mechanical spring, is coupled between the throttle interface 200 and the housing 250. The compliant element 700 is configured to provide further resistance against movement of the throttle interface to simulate known mechanical throttle assemblies.

In some embodiments, the actuator assembly 500 includes a compliant element 750 that biases the brake elements 510, 520 together to generate a preset amount of force between the friction surfaces 511, 521. The compliant element 750 can be coupled in series and/or in parallel with the actuator 550. The compliant element 750 generates a substantially fixed amount of force, while the actuator 550 is configured to provide a variable amount of force as discussed above. This configuration allows the actuator assembly 550 to regulate the amount of force output to the throttle interface 200.

Figure 3:
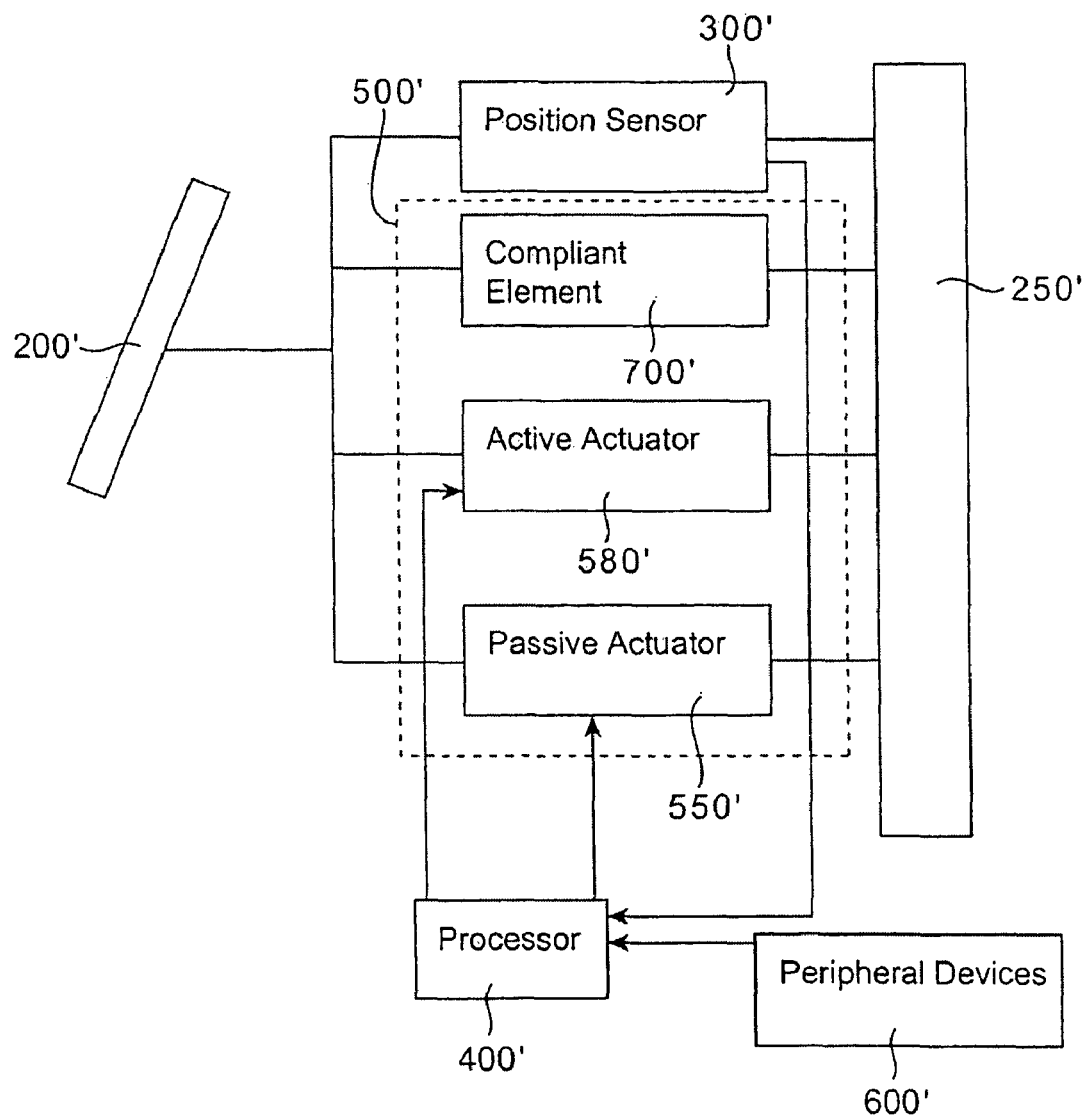
FIG. 3 is a schematic representation of a haptic throttle device according to a further embodiment.

In some embodiments, an actuator device 100' includes a throttle interface 200', a throttle condition sensor 300' and an actuator assembly 500' as illustrated in FIG. 3. The actuator assembly 500' includes a compliant element 700' coupled to the throttle interface 200' and a housing 250'; a resistive actuator 550' coupled to the throttle interface 200' and the housing 250'; and an active actuator 580 coupled to the throttle interface 200' and the housing 250'. A processor 400' is coupled to the resistive actuator 550' and the active actuator 580 and is configured to receive signals from the sensor 300' and output control signals to the active actuator 580 and the resistive actuator 550'.

The active actuator 580 actively provides a controllable amount of force to the throttle interface 200' in addition to the controllable amount of force resistively provided by the resistive actuator 550'. The active actuator 580 actively pushes the throttle interface 200' based on input signals received from processor 400', which in turn is based on signals received from sensor 300' and peripheral inputs 600'.

A number of force sensations can be output via the actuators such as actuators 50, 550, 550', 580. Force effects output on the throttle interface 200, 200' can include, for example, springs, dampers, textures, vibrations, detents, jolts or pulses, inertia, friction, obstructions (barriers), or dynamic force effects. Many of these effects are described in U.S. Pat. Nos. 5,734,373; 6,147,674; 6,154,201; and 6,128,006.

While various embodiments have been described above, it should be understood that they have been presented by way of example only, and not limitation. Thus, the breadth and scope should not be limited by any of the above-described embodiments, but should be defined only in accordance with the following claims and their equivalents.

The previous description of the embodiments is provided to enable any person skilled in the art to make or use the system. While the embodiments have been particularly shown and described with reference to embodiments thereof, it will be understood by those skilled in art that various changes in form and details may be made therein without departing from the spirit and scope of the claims.

For example, although the above embodiments are described as including only one sensor, in alternative embodiments any number of sensors may be used to detect various conditions of the throttle interface and or various vehicle conditions.

Although the above embodiments are described as receiving signals from peripheral devices at a processor, in alternative embodiments the haptic throttle device can include local sensors that are configured to actively detect various conditions of peripheral devices.

Although the actuator 550 is described above as being configured to output a force substantially normal to the brake element 510 and the brake element 520, in alternative embodiments, the force need not be normal to the brake elements 510, 520.

What is claimed is:

1. A method, comprising:
   receiving a sensor signal at a processor from a sensor coupled to a foot operated throttle pedal of a vehicle, the sensor signal associated with a position of the foot operated pedal;
   receiving an input signal at the processor from a peripheral device separate from the sensor, the input signal carrying information independent of speed at which the vehicle is traveling;
   outputting a first haptic feedback force to the foot operated pedal via an actuator, the first haptic feedback force associated with the sensor signal; and
   outputting a second haptic feedback force to the foot operated pedal via the actuator, the second haptic feedback force associated with the input signal.

2. The method of claim 1, wherein the foot operated pedal is a throttle pedal.

3. The method of claim 1, wherein the first haptic feedback force or the second haptic feedback force is an active haptic feedback force.

4. The method of claim 1, wherein the first haptic feedback force or the second haptic feedback force is a resistive haptic feedback force.

5. The method of claim 1, wherein the first haptic feedback force or the second haptic feedback force is a vibration, a detent, a jolt, a damping force, a texture, or a pulse.

6. The method of claim 1, wherein the actuator is an electromagnetic actuator, a hydraulic actuator, a pneumatic actuator, a piezoelectric actuator, a thermal actuator or an electroactive actuator.

7. The method of claim 1, wherein the sensor is a position sensor, a strain gauge or a force sensor.

8. An apparatus, comprising:
   a foot operated throttle pedal of a vehicle;
   a sensor coupled to the pedal and configured to sense a position of the pedal during use, the sensor configured to output a sensor signal associated with the position of the pedal;
   a processor coupled to the sensor and configured to receive the sensor signal, wherein the processor outputs a control signal upon the pedal moving past a threshold position; and
   an actuator coupled to the processor, the actuator configured to output a haptic feedback force to the pedal upon receiving the control signal from the processor.

9. The apparatus of claim 8, wherein the actuator further comprises a resistive actuator configured to output a resistive haptic feedback force to the pedal upon receiving the control signal.

10. The apparatus of claim 8, wherein the actuator further comprises an active actuator configured to output an active haptic feedback force to the pedal upon receiving the control signal.

11. The apparatus of claim 8, wherein the foot operated pedal is a throttle pedal.

12. The apparatus of claim 8, further comprising a peripheral device configured to provide an input signal to the processor, wherein the processor instructs the actuator to output the haptic feedback force upon the processor receiving the input signal from the peripheral device.

13. The apparatus of claim 12, wherein the input signal is independent of speed information of the vehicle.

14. The apparatus of claim 8, wherein the haptic feedback force is a vibration, a detent, a jolt, a damping force, a texture, or a pulse.

15. The apparatus of claim 8, wherein the actuator is an electromagnetic actuator, a hydraulic actuator, a pneumatic actuator, a piezoelectric actuator, a thermal actuator or an electroactive actuator.

16. The apparatus of claim 8, wherein the sensor is a position sensor, a strain gauge or a force sensor.

* * * * *